US009685093B2

(12) United States Patent
Ongkojoyo

(10) Patent No.: US 9,685,093 B2
(45) Date of Patent: Jun. 20, 2017

(54) CUSTOMIZABLE WIRELESS EDUCATION OR OCCUPATIONAL THERAPY TOOL HAVING A SWITCH UNIT AND A TRANSMITTER UNIT

(75) Inventor: Yandi Ongkojoyo, Surabaya (ID)

(73) Assignee: Yandi Ongkojoyo, Surabaya, Jawatimur (ID)

( * ) Notice: Subject to any disclaimer, the term of this patent is extended or adjusted under 35 U.S.C. 154(b) by 980 days.

(21) Appl. No.: 11/322,213

(22) Filed: Jan. 3, 2006

(65) Prior Publication Data
US 2007/0154870 A1   Jul. 5, 2007

(51) Int. Cl.
G09B 19/00   (2006.01)
G09B 1/36   (2006.01)
G06F 3/02   (2006.01)
G06F 3/0354   (2013.01)
G09B 5/00   (2006.01)

(52) U.S. Cl.
CPC ............. *G09B 1/36* (2013.01); *G06F 3/0219* (2013.01); *G06F 3/03547* (2013.01); *G09B 5/00* (2013.01)

(58) Field of Classification Search
CPC .................................................. G09B 19/00
USPC .............................. 434/156, 236, 307 R, 362
See application file for complete search history.

(56) References Cited

U.S. PATENT DOCUMENTS

| | | | | |
|---|---|---|---|---|
| 2,572,335 | A * | 10/1951 | Hafke | 200/303 |
| 4,846,687 | A * | 7/1989 | White et al. | 434/112 |
| 5,057,024 | A * | 10/1991 | Sprott et al. | 434/146 |
| 5,088,928 | A * | 2/1992 | Chan | 434/339 |
| 5,613,137 | A * | 3/1997 | Bertram et al. | 710/1 |
| 5,769,643 | A * | 6/1998 | Stevens, III | 434/350 |
| 5,823,782 | A * | 10/1998 | Marcus et al. | 434/156 |
| 5,988,902 | A * | 11/1999 | Holehan | 400/479.1 |
| 5,991,693 | A * | 11/1999 | Zalewski | 701/300 |
| 6,167,353 | A * | 12/2000 | Piernot et al. | 702/94 |
| 6,190,174 | B1 * | 2/2001 | Lam | 434/169 |
| 6,201,947 | B1 * | 3/2001 | Hur et al. | 434/317 |
| 6,303,887 | B1 * | 10/2001 | Ando | 200/512 |
| 6,356,255 | B1 * | 3/2002 | Weil et al. | 345/156 |
| 6,400,272 | B1 * | 6/2002 | Holtzman et al. | 340/572.1 |
| 6,464,503 | B1 * | 10/2002 | Heit et al. | 434/156 |
| 6,556,184 | B2 * | 4/2003 | Weil et al. | 345/156 |
| 6,650,867 | B2 * | 11/2003 | Redford et al. | 434/307 R |
| 6,659,836 | B1 * | 12/2003 | Yamasaki et al. | 446/175 |
| 6,661,407 | B2 * | 12/2003 | Severson | 345/173 |
| 6,726,485 | B2 * | 4/2004 | Marcus et al. | 434/156 |
| 6,729,881 | B2 * | 5/2004 | Marcus et al. | 434/156 |
| 6,739,874 | B2 * | 5/2004 | Marcus et al. | 434/156 |
| 6,755,655 | B2 * | 6/2004 | Marcus et al. | 434/156 |

(Continued)

FOREIGN PATENT DOCUMENTS

EP   1369791 A2   10/2003

OTHER PUBLICATIONS

UKIPO Examination Report, Aug. 20, 2009.

*Primary Examiner* — Andrew Iwamaye
*Assistant Examiner* — Alvin Carlos

(57) ABSTRACT

A wireless computer-aided occupational therapy and education tool for young children or children with developmental delays. The tool comprises a wireless input device and preferably a covering. The wireless input device of the tool comprises a switch, a transmitter, and identification code. The covering can be made in various shapes, sizes, and colors. The wireless input device is removably attachable to the covering.

53 Claims, 8 Drawing Sheets

(56) References Cited

U.S. PATENT DOCUMENTS

| | | |
|---|---|---|
| 6,952,196 B2* | 10/2005 | Weil et al. .................... 345/156 |
| 7,214,066 B2* | 5/2007 | Marcus et al. ................ 434/323 |
| 7,217,135 B2* | 5/2007 | Marcus et al. ................ 434/323 |
| 7,351,062 B2* | 4/2008 | Gordon et al. ............... 434/178 |
| 2002/0109665 A1* | 8/2002 | Matthews et al. ............ 345/156 |
| 2003/0018790 A1* | 1/2003 | Nonaka ......................... 709/228 |
| 2003/0071836 A1* | 4/2003 | Chang ........................... 345/700 |
| 2004/0063078 A1* | 4/2004 | Marcus et al. ................ 434/156 |
| 2004/0140998 A1* | 7/2004 | Gravina et al. ............... 345/716 |
| 2005/0053907 A1* | 3/2005 | Liao ............................... 434/317 |

* cited by examiner

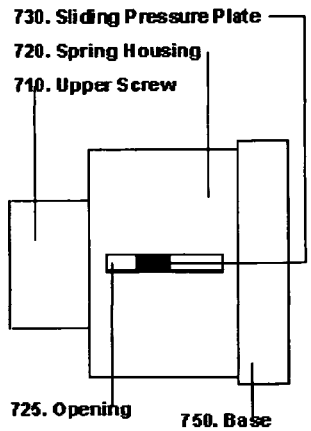
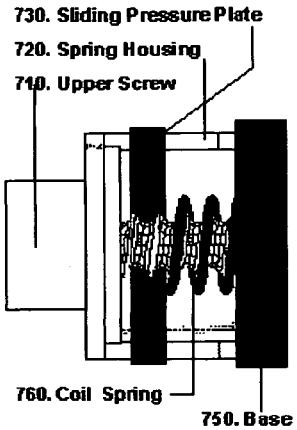
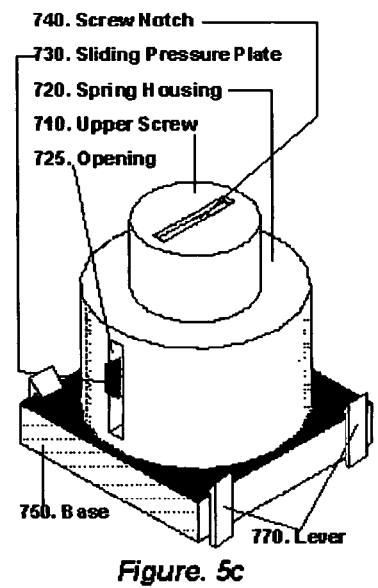
Figure. 5a   Figure. 5b   Figure. 5c
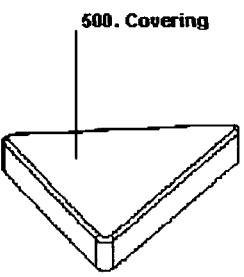
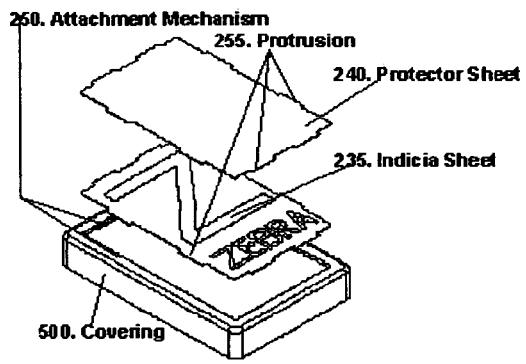
Figure. 6a   Figure. 6b
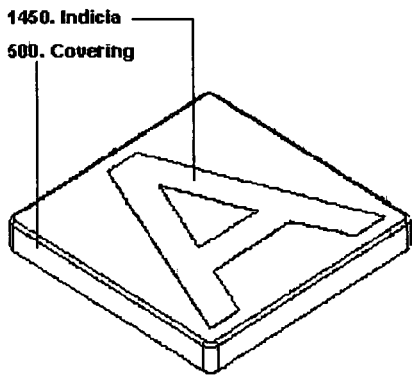
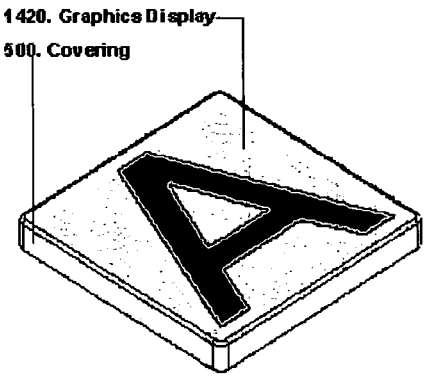
Figure. 6c   Figure. 6d

CUSTOMIZABLE WIRELESS EDUCATION OR OCCUPATIONAL THERAPY TOOL HAVING A SWITCH UNIT AND A TRANSMITTER UNIT

CROSS-REFERENCE TO RELATED APPLICATIONS

None

OTHER REFERENCES

Teaching Developmentally Disabled Children: The Me Book by O. Ivar Lovaas

BACKGROUND

Field of the Invention

This invention relates generally to a computer-aided occupational therapy and education tool, specifically to a customizable wireless input device for use in computer-aided education or occupational therapy comprising Applied Behavior Analysis (ABA) method for young children or children with developmental delays comprising children with autism spectrum disorders or mental retardation.

Description of Prior Art

Some children are born with developmental delays comprising autism spectrum disorders and mental retardation. The percentage of children born with autism spectrum disorders, particularly, has been increasing exponentially during the last few years. Even though not all the causes of developmental delays—especially autism—are known, occupational therapists have been using applied behavior analysis (ABA) as well as other methods somewhat successfully to rehabilitate children with developmental delays. Nevertheless, many hours (many methods suggest at least eight hours) of extensive therapy sessions are required every single day. Until now, all the therapy sessions have to be done manually by qualified persons or therapists. Unfortunately, because of the dramatic increase in autism, there is a shortage of qualified therapists. Therefore, many therapists are forced to provide treatment to more children than they can. Furthermore, because of this shortage, many state-funded early intervention programs are no longer capable to provide the required intensive treatment, forcing parents and guardians to devote most of their time to care for their autistic children by themselves or coordinate their own home-based early intervention programs at their own expenses. This is a great burden for both the parents or guardians and the therapists.

Modern computer systems and software help people computerize many tasks. However, the existing computer input devices comprising keyboards, mice or trackballs are not suitable for rehabilitating children with certain developmental delays or educating young children since many of these children do not have sufficient dexterity, mental capacity, or fine motor control to operate these devices conveniently. Moreover, the majority of these devices cannot prevent access to functions that are not suppose to be accessible by young children or children with certain developmental delays. Furthermore, virtually all of these input devices have small detachable parts, which present a choking hazard. Besides, the majority of these input devices are not adapted to have their appearances easily altered. Additionally, many of the devices available today are required to be attached to the computer system by a cord, which may present a strangulation hazard to some children in addition to being inconvenient and distracting.

Therefore, a wireless computer-aided occupational therapy and education tool for young children or children with developmental delays is needed.

SUMMARY OF THE INVENTION

The invention is defined by the appended claims with the specific embodiment shown in the attached drawings. In summary, the current invention is a tool that can facilitate computer-aided therapy and education for young children or children with developmental delays comprising children with autism and children with mental retardation.

In one embodiment, the system comprises a receiver device and at least one wireless input device. The receiver device comprises a USB microcontroller or a microcontroller paired with a USB controller, a receiver unit and preferably a transmitter unit to communicate with wireless input devices. The receiver device has an identification code, which is modifiable and preferably displayable by several methods, including mechanical or hardware and software. The wireless input device comprises an activation switch unit, a transmitter unit and preferably a receiver unit to communicate with computer system through the receiver device. The wireless input device has an identification code, preferably a composite identification comprising device identification and system identification, modifiable and preferably displayable by several methods, including mechanical or hardware and software. The wireless input device may also comprise a microcontroller and a graphic display.

In another embodiment, the system further comprises a covering with attaching mechanism that allows one or more wireless input device to be removably attached to it. In this embodiment, the wireless input device may also comprise a communication unit to send feedback commands to a feedback device attached to the covering. The covering preferably comes in various sizes, shapes, and colors, and may comprise means for customizing the appearance of the surface of the covering. The means for customizing comprising an embedded graphic display, a sticker, or one or more sheets with indicia and preferably a protector sheet disposed on or removably attached to the surface of the covering. Furthermore, the covering can be made in various materials with various properties, comprising materials in various degrees of resiliency, materials in various degrees of transparency, and materials in various degrees of conductivity. A covering made from a transparent or semi-transparent material directly or indirectly covers a wireless input device, while still allowing the wireless input device or anything below its surface to be viewed. Furthermore, a covering made from a material with a good conductivity can be used as a sensor of a touch sensor circuit, while a covering made from a resilient material can be used by children with reduced sensitivity to pain, allowing them to use the tool without injuring themselves. The covering may also comprise means to urge the covering upward, and optionally means to secure the covering to a surface. Furthermore, the covering may comprise one or more output devices, or an attaching mechanism to secure one or more output devices. The output device may comprise means to communicate with the wireless input device attached to the covering through a direct or an indirect connection. The output device may be able to produce one or more sensory outputs, comprising tactile, visual, audio, or other sensory outputs.

In operation, configuration software is provided to relate an identification code with a character or control understood by a computer system. The relation is stored in a table, and the table is either uploaded to the receiver device via a USB connector or stored in the computer as data for keymapper software. Optionally, the software also displays identification codes and other data required.

The foregoing has outlined rather broadly the more pertinent and important features of the present invention in order that the detailed description of the invention that follows may be better understood so that the present contribution to the art can be more fully appreciated. Additional features of the invention will be described hereinafter, which form the subject of the claims of the invention. It should be appreciated by those skilled in the art that the conception and the specific embodiments disclosed might be readily utilized as a basis for modifying or designing other structures for carrying out the same purposes of the present invention. It should also be realized by those skilled in the art that such equivalent structures do not depart from the spirit and scope of the invention as set forth in the appended claims.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

The foregoing features and other aspects of this invention will now be described in accordance with the drawings in which:

FIGS. 5a, 5b, and 5c show various views of a mechanism to adjust the actuation force of the spring mechanism as means to adjust the urge.

FIGS. 6a, 6b, 6c, and 6d show the perspective view of the upper side of the covering, showing various means to alter the appearance of the covering.

Figure 1:
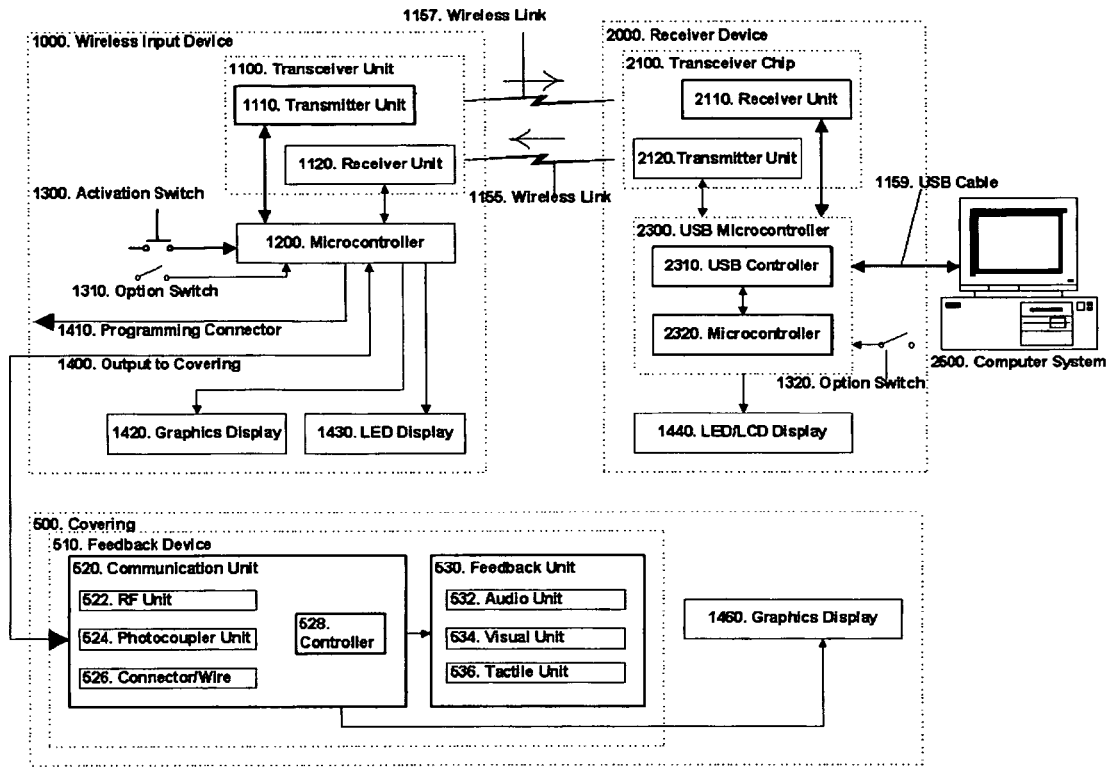
FIG. 1 shows the block diagram of the current invention.

REFERENCE NUMERALS IN DRAWINGS 200 casing of wireless input device
210 attachment notches of wireless input device
220 baseplate of casing
230 indicia sheet of wireless input device
235 removably indicia sheet of wireless input device
240 removably protector sheet of wireless input device
250 openings of wireless input device
255 small protrusions
500 covering
510 feedback device of covering
520 communication unit of covering
522 radio frequency unit connecting covering to wireless input device
524 photocoupler unit connecting covering to wireless input device
526 connector connecting covering to wireless input device
528 controller controlling covering
530 feedback unit of covering
532 audio unit of feedback unit
534 visual unit of feedback unit
536 tactile unit of feedback unit
570 attachment levers of covering
700 coil spring system
710 upper screw of coil spring system
720 spring housing of coil spring system
725 openings of coil spring system
730 pressure plate of coil spring system
740 screw notch of coil spring system
750 base of coil spring system
760 coil spring of coil spring system
770 lever of spring coil system
780 rubber cup
785 magnet
790 coil spring
795 suction cup
810 attachment mechanism of covering/feedback device
820 photodiode of feedback device
825 infrared LED of wireless input device
830 connector connecting wireless input device to feedback device
835 wire connecting wireless input device to feedback device
850 light bulb of feedback device
1000 wireless input device
1100 transceiver unit of wireless input device
1110 transmitter unit of wireless input device
1120 receiver unit of wireless input device
1155 wireless transmission from receiver device to wireless input device
1157 wireless transmission from wireless input device to receiver device
1159 connection to computer system
1200 microcontroller of wireless input device
1300 activation switch of wireless input device
1310 option switch of wireless input device
1311 printed identification indicia of wireless input device
1320 option switch of receiver device
1410 programming connector to a computer system
1420 graphic display of wireless input device
1430 LED display of wireless input device
1440 LED/LCD display of receiver device 1450 indicia printed on covering
1460 graphic display of covering
2000 receiver device
2100 transceiver unit of receiver device
2110 receiver unit of receiver device
2120 transmitter unit of receiver device
2300 USB microcontroller of receiver device
2310 USB controller of receiver device
2320 microcontroller of receiver device
2500 computer system
3010 starting point of wireless input device software
3015 checking for connection to computer system
3020 option switch checking (toggle programming mode on)
3030 activation switch checking (running mode), $1^{st}$
3040 activation switch checking (running mode), $2^{nd}$
3050 activation switch checking (running mode), $3^{rd}$
3060 activation switch checking (running mode), $4^{th}$
3120 option switch checking (toggle programming mode off)
3130 activation switch checking (programming mode), $1^{st}$
3140 activation switch checking (programming mode), $2^{nd}$
3150 activation switch checking (programming mode), $3^{rd}$
3160 activation switch checking (programming mode), $4^{th}$
3200 feedback data checking
3210 feedback data retrieval
3220 feedback data forwarding
3300 display data packet creation
3310 displays identification
3410 data packet creation
3420 data packet transmission
3510 current identification transmission
3520 checking for identification modification request
3530 receives new identification
3540 updates identification
4010 starting point of receiver device software
4020 USB enumeration
4030 initialization to running mode
4040 displays current system identification
4100 checks for mode change request
4110 retrieves new mode
4200 checks if data is ready
4210 checks if option key is pressed (increment)
4215 increases identification
4220 checks if option key is pressed (decrement)
4225 decreases identification
4300 receives data packet
4310 extract information from data packet
4320 checks if identification matches
4330 checks mode
4350 retrieves identification from computer
4355 updates correlation table
4357 displays identification
5000 starting point of host software
5010 sends request for programming mode
5100 checks for exit command
5110 input identification from user
5120 sends identification to receiver device
5130 sends request for running mode
5200 ending point of host software

DETAILED DESCRIPTIONS OF THE EMBODIMENTS

Detailed descriptions of the embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure, or manner.

FIG. 1 shows the block diagram of the current invention. There are various methods to build the wireless input device (1000) and the receiver device (2000). One can build a simple variable frequency oscillator as the transmitter unit (1110) for the wireless input device (1000) and receivers that detects carrier waves in various frequencies as the receiver device (2000). A transmitter (1110) modulated with certain frequencies for the wireless input device and a receiver (2110) with band-pass filters for the receiver device is another possible solution. Moreover, an activation switch (1300) can be used to turn the wireless input device on or off, while the option switch (1310) can be used to control the frequency of an oscillator. Furthermore, adding a receiver (1120) in the wireless input device (1000) and a transmitter (2120) in the receiver device (2000) can establish a bi-directional wireless communication (1155, 1157) between the wireless input device (1000) and the receiver device (2000). Additionally, the receiver data can communicate with the computer system (2500) through a parallel port or a custom-made parallel interface card without requiring a processor. Nevertheless, there are so many chips built for radio frequency communication and modern peripheral control (such as USB and Firewire) that can perform the functions more effectively, simplify the design and cut the manufacturing cost. Therefore, even though the solutions previously mentioned are possible, they are not discussed in this patent application. Additionally, the inclusion of standard telecommunication and electronics techniques such as frequency hopping, SAW filters, the utilization of power saving mode, and electromagnetic wave powered circuits are considered trivial. This, even though some of these techniques are incorporated in the current invention, they are not discussed in this patent application.

FIG. 1 shows that the wireless input device (1000) proposed in the current invention comprises:

1. A transmitter unit (1110) and preferably a receiver unit (1120) to communicate with receiver device. In many cases, the transmitter unit (1110, 2110) and the receiver unit (1120, 2120) are integrated in one transceiver unit (1100, 2100).
2. An activation switch unit (1300) preferably disposed on the lower surface of the casing of the wireless input device (1000) to initiate data transmission (1157) from the wireless input device (1000) to the receiver device (2000).
3. Means to modify the identification(s) of the wireless input device (1000) comprising at least one of the followings:
   a. At least one option switch (push-button, rotary, or selector) (1310) to modify the identification(s) of the wireless input device (1000) directly or indirectly.
   b. Means to communicate (1410, 1155, 1557, 1559) with a software executed in a computer system (2500) through a direct (connector and wires) (1410) or an indirect connection (wireless) (1155, 1157, 1159)—preferably through the receiver device (2000) connected to the computer system (2500)—to modify the identification(s) of the wireless input device (1000).
4. Means to display the identification(s) of the system comprising at least one of the followings:

a. Printed indicia (see FIG. 2d-1311) to show the identification(s) of the wireless input device, if the option switch unit (1310, see also FIG. 2d) is one or more switches having multiple positions that can directly identify the wireless input device (1000).

b. A display system (1420, 1430) embedded on the casing of the wireless input device. Graphic display system (1420) also shows images sent by the computer, while numeric/alphanumeric display system (1430, preferably a LED display) exclusively shows identification(s) of the system.

c. Means to communicate (1155, 1157, 1159) with a software executed in a computer system (2500) through a direct (connector and wires) or an indirect connection (wireless)—preferably through the receiver device (2000) connected (1159) to the computer system (2500)—to display the identification(s) of the wireless input device (1000).

Furthermore, the block diagram shows that wireless input device may comprise:

1. A microcontroller (1200)
2. A graphic display system (1420) such as an LCD display, an OLED display, or a sheet of ePaper, to display images uploaded by the computer system (2500) through the receiver device (2000) whereby the graphic display (1420) can also be used to display the identification(s) of the wireless input device (1000).
3. Means to communicate with the covering (500) the wireless input device (1000) is attached to, comprising at least one of the followings:
   a. A direct connection (526) with wire(s) and connector(s).
   b. An indirect or coupled connection such as a photo coupler (essentially a light source coupled with a light sensor attached to a covering, 524) or a radio frequency communication system (522).

The communication links (522, 524, 526) are controlled by a controller (528).

FIG. 1 also shows the receiver device (2000) proposed in the current invention comprises:

1. A USB microcontroller (2300) or a microcontroller (2320) paired with a USB controller (2310) or other means to communicate with a computer system (2500) comprising a serial communication controller, a parallel communication controller or a Bluetooth controller.
2. A receiver unit (2110) and preferably a transmitter unit (2120) to communicate with wireless input devices. In many cases, the receiver unit (2110) and the transmitter unit (2120) are integrated in one transceiver unit (2100).
3. Means to modify the identification codes of the system comprising at least one of the followings:
   a. At least one option switch (push-button, rotary, or selector) (1320) to modify the identification of the receiver device (2000) directly or indirectly (if the system incorporates a composite identification system).
   b. Means to communicate with programming software executed in the computer system (2500) to modify the identification of the receiver device (2000) (if the system incorporates a composite identification system) and optionally the identification(s) of a wireless input device (1000).
4. Means to display the identification codes of the system comprising at least one of the followings:
   a. Printed indicia to show the identification of the receiver device, if the option switch (1320) is a switch having multiple positions that can directly identify the receiver device (2000).
   b. A display system (1440) to display the identification of the receiver device (2000) when the system is in use or running mode (and the system incorporates a composite identification system), and optionally the identification(s) of a wireless input device (1000) when the system is in programming mode.
   c. Means to communicate (1159) with programming software executed in the computer system (2500) to display the identification of the receiver device (2000) when the system is in use or running mode (and the system incorporates a composite identification system) and preferably the identification(s) of a wireless input device (1000) when the system is in programming mode.

In addition to the wireless input device (1000) and the receiver device (2000), the system may comprise a covering (500) to modify the physical appearance of the wireless input device (1000). The covering (500) preferably comes in various sizes, shapes, and colors, and comprises attachment mechanism. The wireless input device (1000) be removably attached to the covering (500) by utilizing this mechanism. The covering (500) may also comprise:

1. A graphic display (1460) embedded or removably attached to the covering (500) and preferably controlled by a controller (528) that communicates with the wireless input device (1000).
2. A feedback device (510), which is either fixed or removably attached to it. The feedback device (510) may comprise:
   a. A communication unit (520), whereby the communication unit may comprise one or more of the followings:
   A radio frequency communication unit (522)
   A photocoupler unit (524)
   A connecter unit (526)
   A controller (528) that preferably also controls the graphic display (1460)
   b. A feedback unit (530), whereby the feedback unit may comprise one or more of the followings:
   An audio unit (532) such as a buzzer
   A visual unit (534) such as a light source
   A tactile unit (536) such as a vibrator Any pressure or operating means applied to the covering (500) is relayed to the wireless input device (1000). If the intensity of the pressure or operating means exceeds a certain limit, the pressure activates the activation switch unit (1300) of the wireless input unit (1000). The covering (500) can be molded in any forms. It is even possible to design a special covering to convert a wireless input device into a foot-activated input device for the therapist if the therapist needs to discreetly provide input for the computer system.

FIGS. 2a, 2b, 2c, 2d, 2e, and 2f show the perspective view of the lower side of the wireless input device of the invention, showing some of the possible configurations of switches of the wireless input device and means to assign an identification code.

Figure 2A:
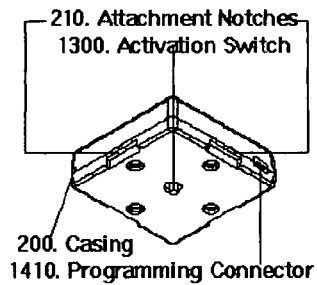
FIGS. 2a, 2b, 2c, 2d, 2e, and 2f show the perspective view of the lower side of the wireless input device of the invention.

FIG. 2a shows a wireless input device with only one push-button switch (1300), attached on the lower surface of the casing (200) of the wireless input device, as an activation switch. Since there is only one push-button serving as an activation switch, a casing with additional means to urge the casing and the wireless input device attached to it upward or additional means to urge the wireless input device upward is mandatory. If no option switch is incorporated, the identification of the wireless input device is modifiable either by direct connection through a connector (1410) or by wireless connection. FIG. 2*a* also shows attachment notches (210) that facilitate the wireless input device to be removably attached to a covering.

Figure 2B:
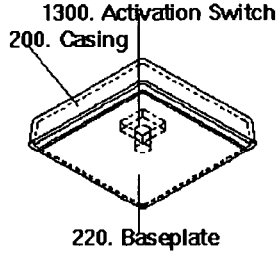

FIG. 2*b* shows a wireless input device with a switch unit (1300) as an activation switch, disposed inside the casing (200) of the wireless input device, between the upper part of the casing and the lower part/baseplate (220) of the casing. Therefore, applying direct or indirect pressure to the upper part of the casing operates the switch unit (1300). The wireless input device shown in FIG. 2*b* is very suitable to be used when the wireless input device has to be positioned on a soft surface, such as a carpeted floor, since the surface of the baseplate (220) is relatively large. Thus, it is also very suitable to be used as foot-activated switch for the therapist.

Figure 2C:
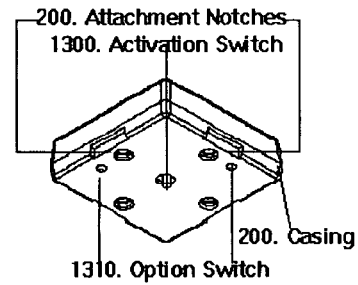

FIG. 2*c* shows a wireless input device with only one push-button switch (1300) as an activation switch and at least one push-button switch (1310) which top is partially hidden inside the casing (200) of the wireless input device as an option switch. The option switches (1310) will not operate unless a user accesses them directly to modify the identification of the wireless input device. Therefore, the wireless input device will not be inadvertently reprogrammed during operation. Moreover, since there is only one push-button serving as an activation switch, a casing with additional means to urge the casing and the wireless input device attached to it upward or additional means to urge the wireless input device upward is mandatory. FIG. 2*c* also shows attachment notches (210) that facilitate the wireless input device to be removably attached to a covering.

Figure 2D:
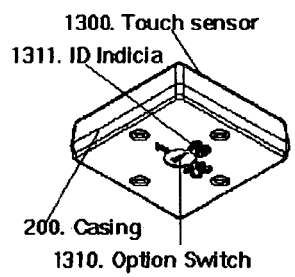

In FIG. 2*d*, the identification of the wireless input device can be modified with a rotary or selector switch (1310) as an option switch, while the operated means of the wireless device is a touch sensor (1300) disposed on surface of the casing (200) as an activation switch with indicia (1311) that labels the identification of the wireless input device. During use or operation, touching or applying sufficient pressure to the touch sensor operates the wireless input device. Therefore, this configuration allows the wireless input device to operate without any covering or additional means to urge the wireless input device upward.

Figure 2E:
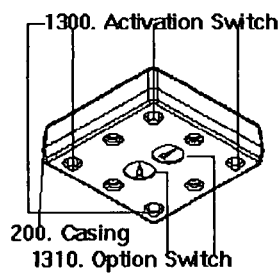

In FIG. 2*e*, the wireless input device has two rotary or selector switches (1310) as option switches, to illustrate that the identification of wireless input device may comprise a device identification code and a system identification code, forming a composite identification code. The system identification code identifies the computer system the wireless input device belongs to, and the device identification code identifies a wireless input system in a system. One of these two switches (1310) assigns the system identification, while the other one assigns the device identification. Consequently, by adopting this composite identification, a system-identification code can be assigned by hardware or software means to the receiver device, allowing the receiver device to selectively respond only to signals from wireless input devices having the same system identification assigned to it. An exception can be made when the signal is from a wireless input device currently in programming mode and doesn't have a display system to display its identification(s). The operated means of the wireless device shown is a switch unit comprising four push button switches (1300) as activation switches, connected in such way that pressing one or more switches operates the wireless input device. This configuration can be achieved by connecting four push-on (normally close/NC) switches in a parallel manner or four push-off (normally open/NO) switches in a serial manner.

The actuation force of the activation switches (1300) also serves as means to urge the wireless input device (and the covering it is attached to) upward, especially when the wireless input device is not attached to a covering or the covering doesn't have any additional means to urge the wireless device upward. During use or operation, applying sufficient pressure to the upper side of the casing of the wireless input device operates one or more activation switches (1300), which in turn operate the wireless input device. Since the four push buttons provide actuation forces simultaneously to the wireless input device, this configuration allows the wireless input device to operate without any covering or additional means to urge the wireless input device upward.

Figure 2F:
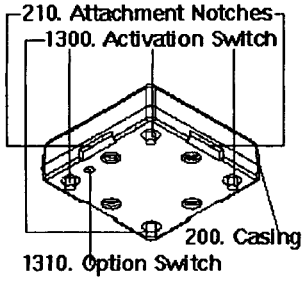

FIG. 2*f* shows a wireless input device with the preferred switch configuration, four push-button switches (1300) serving as activation switches and another push-button or toggle switch (1310) partially hidden inside the casing (200) of the wireless input device as an option switch. The option switch (1310) will not operate unless a user accesses them directly to modify the identification of the wireless input device. Therefore, the wireless input device will not be accidentally programmed during operation. When a user operates the option switch (1310) to enter the programming mode, the function of the activation switches (1300) is temporarily altered. While in programming mode, the user can use the activation switches (1300) to modify the identification of the wireless input device. The wireless input device returns to operating mode when the user presses the option switch again. If the activation switch (1300) is a push-button switch, it is also possible to pre-program the wireless input device to return to operating mode after a certain amount of time passes but no identification modification occurs. FIG. 2*f* also shows attachment notches (210) that facilitate the wireless input device to be removably attached to a covering.

In summary, the switch configuration of the wireless input device should at least comprise an operated means such as:
1. A single push-button switch disposed on the surface of the casing, as shown in FIGS. 2*a* and 2*c*.
2. A plurality of push-button switches which actuation forces also serve as means to urge the wireless input device upward, disposed on the surface of the casing, as shown in FIGS. 2*e* and 2*f*.
3. A switch unit disposed inside the casing, between the upper part and the lower part of the casing, as shown in FIG. 2*b*.
4. A touch sensor disposed on the upper surface of the casing, as shown in FIG. 2*d*.

Moreover, the identification of the wireless input device can be altered by external means, which means that the wireless input device can function without any option switches, as shown in FIGS. 2*a* and 2*b*. However, for convenience, the switch configuration may also comprise one or more option switches as means for altering the identification(s) such as:
1. A rotary or selector switch (as shown in FIG. 2*d*) to directly modify a non-composite identification code.
2. A plurality of rotary or selector switches (as shown in FIG. 2*e*) to directly modify each element of a composite identification code.
3. At least one push-button switch (as shown in FIG. 2*c*) to modify an identification code by circling through all allowable values of identification code or element of an identification code (if the identification code is a composite identification code).

4. At least one push-button or toggle switch (1310) to change the mode of the wireless input device from operating mode to programming mode or vice versa, as shown in FIG. 2*f*.

Figure 3A:
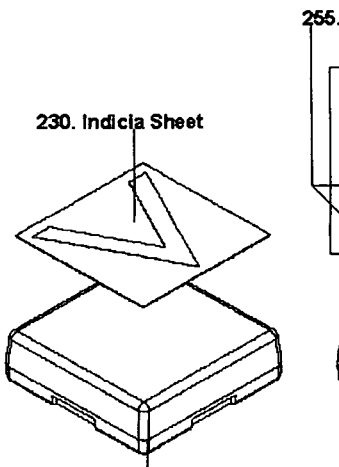
FIGS. 3a, 3b, and 3c show the perspective view of the upper side of the wireless input device.
Figure 3B:
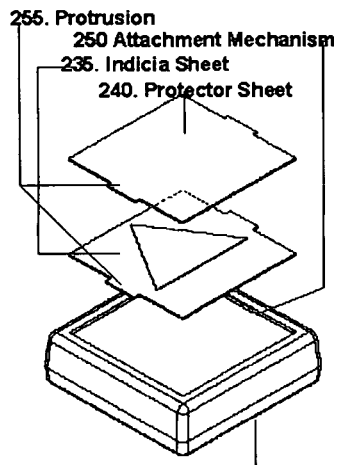
Figure 3C:
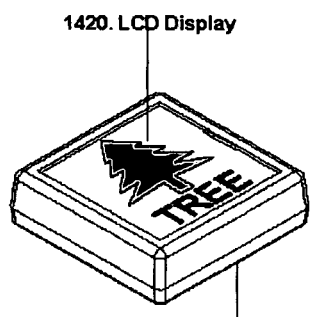

FIGS. 3*a*, 3*b*, and 3*c* show the perspective view of the upper side of the wireless input device of the invention, showing means to alter the appearance of the casing of the wireless input device.

FIG. 3*a* shows an embodiment of the wireless input device whereby the appearance of the wireless input device (1000) can be customized by applying a sticker with Indicia (230) on it. The main advantage of this method of customization is that there is no need for a special attaching mechanism on the upper surface of the casing of the wireless input device, which in turn may distract the user. This method is mainly used when the appearance of the wireless input device (1000) doesn't need to be changed often or the user is easily distracted by the intricate parts of an object.

FIG. 3*b* shows another embodiment of the wireless input device whereby the appearance of the wireless input device (1000) can be customized by disposing or removably attaching an indicia sheet (235) and optionally a protector sheet (240) on top of the indicia sheet (235). Each sheet preferably has small protrusions (255) fitted to the matching opening (250) on the surface of the casing of the wireless input device. The indicia sheet (235) does not need to incorporate any protrusions if a protector sheet (240) is installed.

FIG. 3*c* shows yet another embodiment of the wireless input device (1000) whereby the wireless input device (1000) has an embedded graphic display (1420) on its upper surface. The graphic display (1420) displays indicia sent by a computer system via a receiver device connected to the computer system.

Figure 4A:
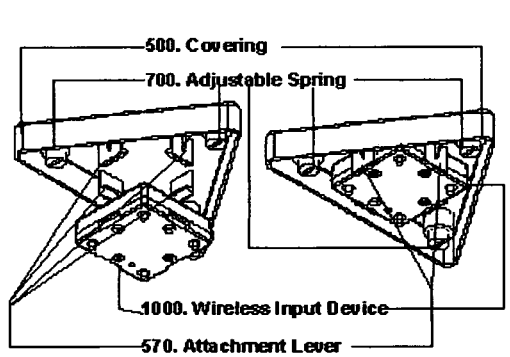
FIGS. 4a, 4b, and 4c show the perspective view of the lower side of the wireless input device and the covering of the invention with the covering and the wireless input device attached and separated.
Figure 4B:
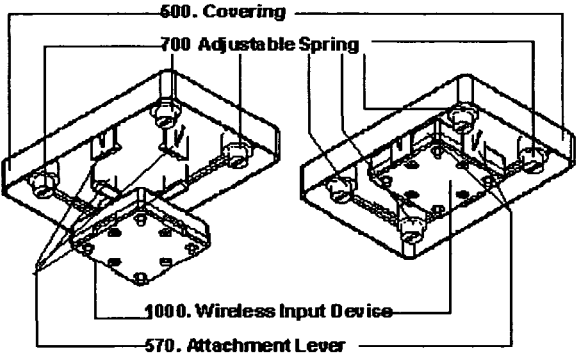
Figure 4C:
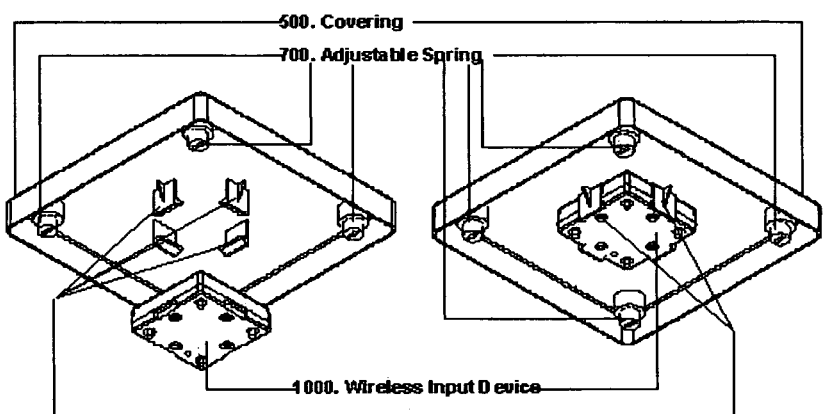

FIGS. 4*a*, 4*b*, and 4*c* show the perspective view of the lower side of the wireless input device and the covering of the invention with the covering and the wireless input device attached and separated, showing operated means, means to assign identification(s), means to removably attach the wireless input device, and means of urging. Since the covering (500) and the wireless input device (1000) are attached, any pressure applied to a covering (500) is passed on to the wireless input device (1000) attached to it, which in turn may activate the activation switch unit of the wireless input device (500, see also FIG. 2).

FIG. 4*a* shows a wireless input device (1000) removably attached to a triangle-shaped covering (500) by utilizing attachment levers (570) protruding from the covering. The covering also comprises means of urging to urge the covering (and the wireless input device attached to it) upward, such as a plurality of coil spring systems (700), preferably with adjustable actuation force as means to urge the covering upward. The left picture shows the wireless input device separated from the triangle-shaped covering, while the right picture shows the wireless input device secured into the covering.

FIG. 4*b* shows a wireless input device (1000) removably attached to a rectangle-shaped covering (500) by utilizing attachment levers (570) protruding from the covering. The covering also comprises means of urging to urge the covering (and the wireless input device attached to it) upward, such as a plurality of coil spring systems (700), preferably with adjustable actuation force as means to urge the covering upward. The left picture shows the wireless input device separated from the rectangle-shaped covering, while the right picture shows the wireless input device secured into the covering.

FIG. 4*c* shows a wireless input device (1000) removably attached to a large square-shaped covering (500) by utilizing attachment levers (570) protruding from the covering. The covering also comprises means of urging to urge the covering (and the wireless input device attached to it) upward, such as a plurality of coil spring systems (700), preferably with adjustable actuation force as means to urge the covering upward. The left picture shows the wireless input device separated from the large square-shaped covering, while the right picture shows the wireless input device secured into the covering.

FIGS. 5*a*, 5*b*, and 5*c* show a coil spring system with adjustable resistance/urge from various views.

FIG. 5*a* shows the side view of the coil spring system. The coil spring system comprises an upper screw (710), a spring housing (720), a sliding pressure plate (730), and a base (750). The openings (725) of spring housing (720) prevent the sliding pressure plate (730) from rotating when the upper screw (710) rotates.

FIG. 5*b* shows a sectional view of the coil spring system, showing the components inside it. The part of the upper screw (710) that is hidden inside the spring housing is shown to be adapted to force the sliding pressure plate (730) to slide along the spring housing when the upper screw is rotated, preferably with a screw driver. The spring housing (720) is shown to prevent the upper screw (710) from being detached from the coil spring system. A coil spring (760) is also shown installed between the sliding pressure plate (730) and the base (750). When the sliding pressure plate (730) slides towards the base (750), the coil spring system will have more resistance or urge. When the sliding pressure plate (730) slides away from the base (750), the coil spring system will have less resistance or urge.

FIG. 5*c* shows a perspective view of the coil spring system. A user can adjust the resistance or urge of the coil spring system by rotating the screw notch (740). FIG. 5*c* also shows the coil spring system removably attached to a surface by levers (770). A user can removably attach the coil spring system to a covering by using this mechanism.

FIGS. 6*a*, 6*b*, 6*c*, and 6*d* show the perspective view of the upper side of the covering, showing various means to alter the appearance of the covering.

FIG. 6*a* shows a triangle-shaped covering (500). The covering can also be manufactured in many other colors, sizes and shapes (comprising diamond, heart, star, rectangle, square, and so on), to accommodate the unique requirements of each user.

FIG. 6*b* shows a rectangle-shaped covering (500) with attachment mechanism (250) on its surface. One or more indicia sheets (235) and preferably a transparent protector sheet (240) with suitable thickness, size, and shape can be disposed or removably attached to the surface of the covering. The top-most sheet (240) preferably has protrusions (255) compatible with the attachment mechanism (250). With a transparent protector sheet (240) or covering covers the upper surface of the covering (500), any regular flashcards commonly used in manual therapy can also be used as an indicia sheet (235) to customize the covering (500).

FIG. 6*c* shows a covering (500) with indicia (1450) shown on the surface of the covering by screen-printing, manual painting, sticker, or any other printing methods.

FIG. 6*d* shows a covering (500) with an embedded graphic display system (1420). The graphic display displays images sent by the computer system through the communication unit of the feedback device.

Figure 7A:
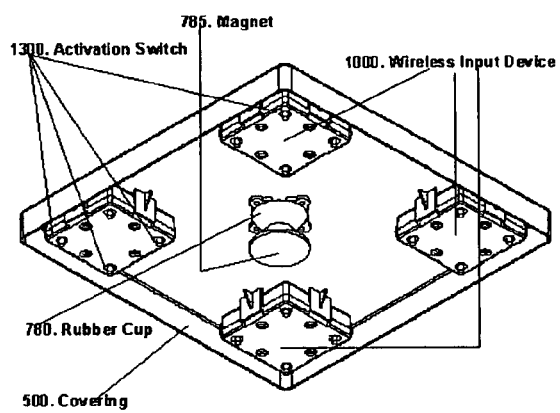
FIGS. 7a and 7b show the perspective view of the lower side of the wireless input device and the covering of the invention.
Figure 7B:
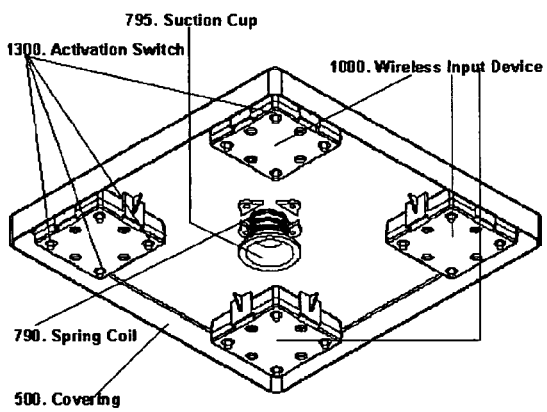

FIGS. 7*a* and 7*b* show the perspective view of the lower side of the wireless input device and the covering of the invention, showing means to urge the covering upward and means to removably attach the covering to an external surface.

FIG. 7a shows a plurality of wireless input devices (1000) attached to a covering (500). The actuation forces of activation switches (1300) also urge the wireless input device (1000) and consequently the covering (500) upward. Additionally, a rubber cup (780) provides additional means for urging the covering upward. Furthermore, a magnet (785) can be used to removably attach the assembled covering and wireless input devices to a surface made from or covered with a ferromagnetic material comprising iron or steel.

FIG. 7b further shows a coil spring (790) provides additional means for urging the covering upward. Furthermore, a suction cup (795) can be used to removably attach the assembled covering and wireless input devices to a relatively smooth surface.

Figure 8A:
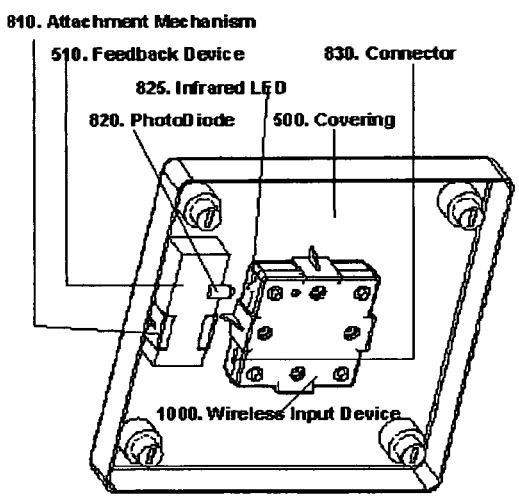
FIGS. 8a and 8b show the perspective view of the lower side of the wireless input device and the covering of the invention.
Figure 8B:
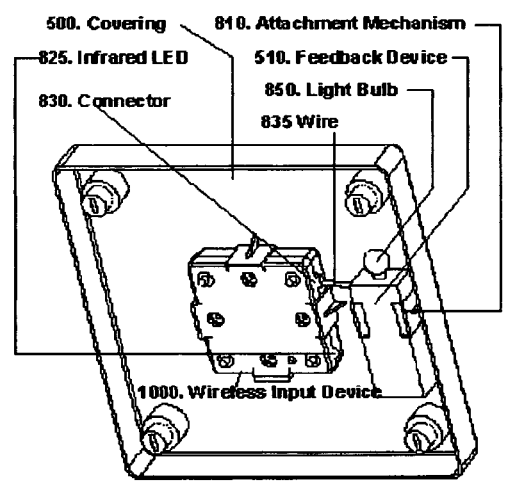

FIGS. 8a and 8b show the perspective view of the lower side of the wireless input device and the covering of the invention.

FIG. 8a shows an assembly of a wireless input device (1000) and a feedback device (510) removably attached to a covering (500) using an attachment mechanism (810). The wireless input device (1000) sends feedback commands to the feedback device (510) via a wireless communication link (in this case, an optical coupling). The wireless input device (1000) has a light source that can be modulated such as an infrared LED (825), while the feedback device (510) has a light-sensitive sensor such as a light dependent resistor (LDR) or a photodiode (820) to receive data from the LED (825). Since the optical coupling virtually isolates the wireless input device from the feedback device, this mechanism is also suitable for feedback devices (510) that incorporate inductors or generates high voltage such as devices that generate vibration by using an electric motor.

FIG. 8b shows an assembly of a wireless input device (1000) and a feedback device (510) removably attached to a covering (500) using an attachment mechanism (810). The wireless input device (1000) sends feedback commands to the feedback device (810) directly via a wire (835) through a connector (830). The feedback device (510) shown in FIG. 8b controls a light bulb (850) that can be controlled by the wireless input device via the wire (835).

Figure 9A:
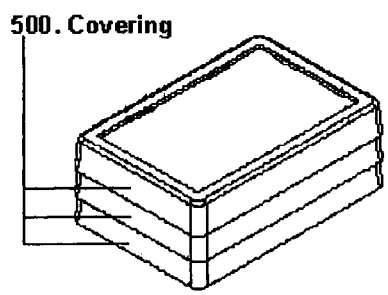
FIG. 9 shows the perspective view of the upper side of several coverings.
Figure 9B:
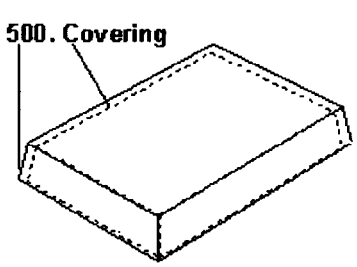

FIG. 9a and FIG. 9b show the perspective view of a plurality of coverings (500) attached or stacked one to another. Each covering is adapted for positioning over the upper exterior surface of another covering. The covering preferably has a top surface corresponding in size and shape to the upper exterior surface of another covering over which it is to be positioned, and further having a plurality of sidewalls extending downwardly and flared outwardly from the top surface for receiving the adjacent sides of the covering to be covered.

FIG. 9a shows a plurality of coverings (500) with uniform sizes and shapes stacked one to another. This configuration is especially convenient for storing several coverings in a stacked configuration, with or without a special storage rack.

FIG. 9b shows two coverings (500) wherein the sizes of the coverings are not uniform. Since the covering positioned over the other covering is slightly bigger, it can completely cover the smaller covering. In this configuration, the bigger covering is preferably made from a transparent or semi-transparent material. Therefore, the bigger covering can protect the surface of the smaller covering, or a sheet with indicia placed between the two coverings.

Figure 10:
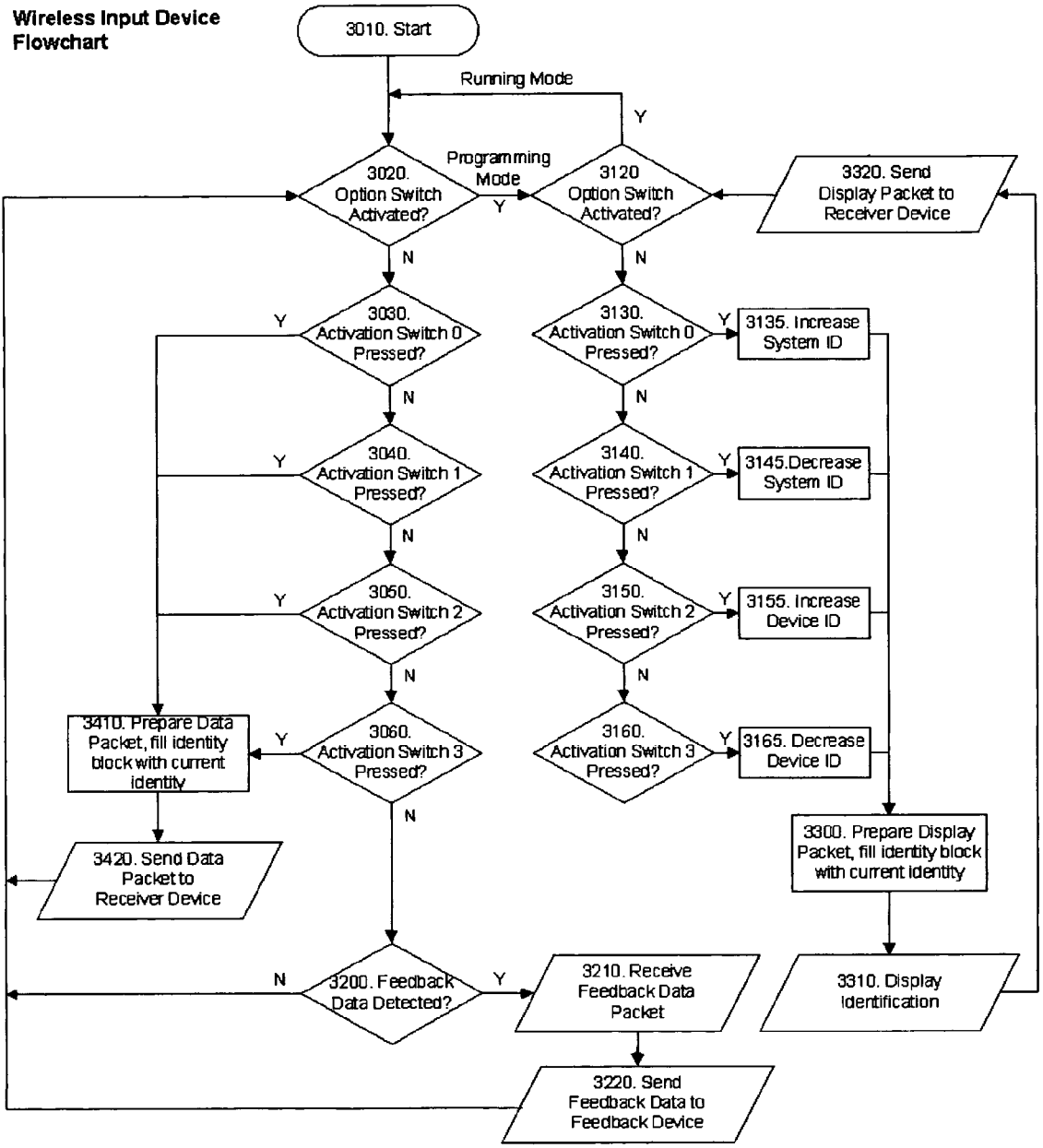
FIG. 10 shows a flowchart of the software controlling the wireless input device with no physical contact to the computer system.

FIG. 10 shows the flowchart of the software that controls the wireless input device of the preferred embodiment.

When a user turns the wireless input device on (3010), the software starts in a running mode then checks if the option switch is activated (3020, 3120). Activating (pressing) the option switch in running mode (3020) converts the current mode to programming mode, while activating the option switch in programming mode (3120) converts the current mode to running mode. The software uses standard signal-edge checking (trailing and leading), including debouncing, and polls (using polling or interrupt technique) the input from all switches to check the option switches and all other switch-related operations, depending on the current mode. For example, if the current mode is running mode, the software checks if at least one activation-switch is pressed (3030, 3040, 3050, 3060). If any of the activation switches is pressed, the software creates a data packet (3410) comprising the identification code of the wireless input device, then send it (3420) to the receiver device and repeat the entire loop. If no activation switch is pressed, the software checks if the receiver device sends a feedback data (3200) by comparing the address attached to the feedback data with the identification (s) of the wireless input device. If the address matches, the software retrieves the data (3210) and forwards (3220) the feedback data to the feedback device attached to the covering the wireless input device attached to, then starts the loop all over again. If the current mode is programming mode, pressing the activation switches modifies (3130, 3140, 3150, 3160) the identification of the wireless input device. If the identification is modified, the software constructs (3300) a display data packet, displays the identification on the embedded display (3310), then sends the data packet to the receiver, then repeat the loop all over again. If during this programming process the option switch is pressed once more, the software enters the running mode (3120).

The flowchart shown in FIG. 10 also shows that the preferred embodiment requires only one option switch embedded on the wireless input device, since pressing option switch enters the wireless input device into a programming mode, whereby the activation switches can be used to modify the identifications of the wireless input device.

Additionally, the flowchart shown in FIG. 10 shows that the system also comprises means to provide feedback to the user.

Furthermore, since the flowchart shows that the identifications are stored in memory instead of mechanically coded in a selector or rotary switch, that number of possible system identification and device identification of the wireless input device are limited only by the capability of the microcontroller being used.

Figure 11:
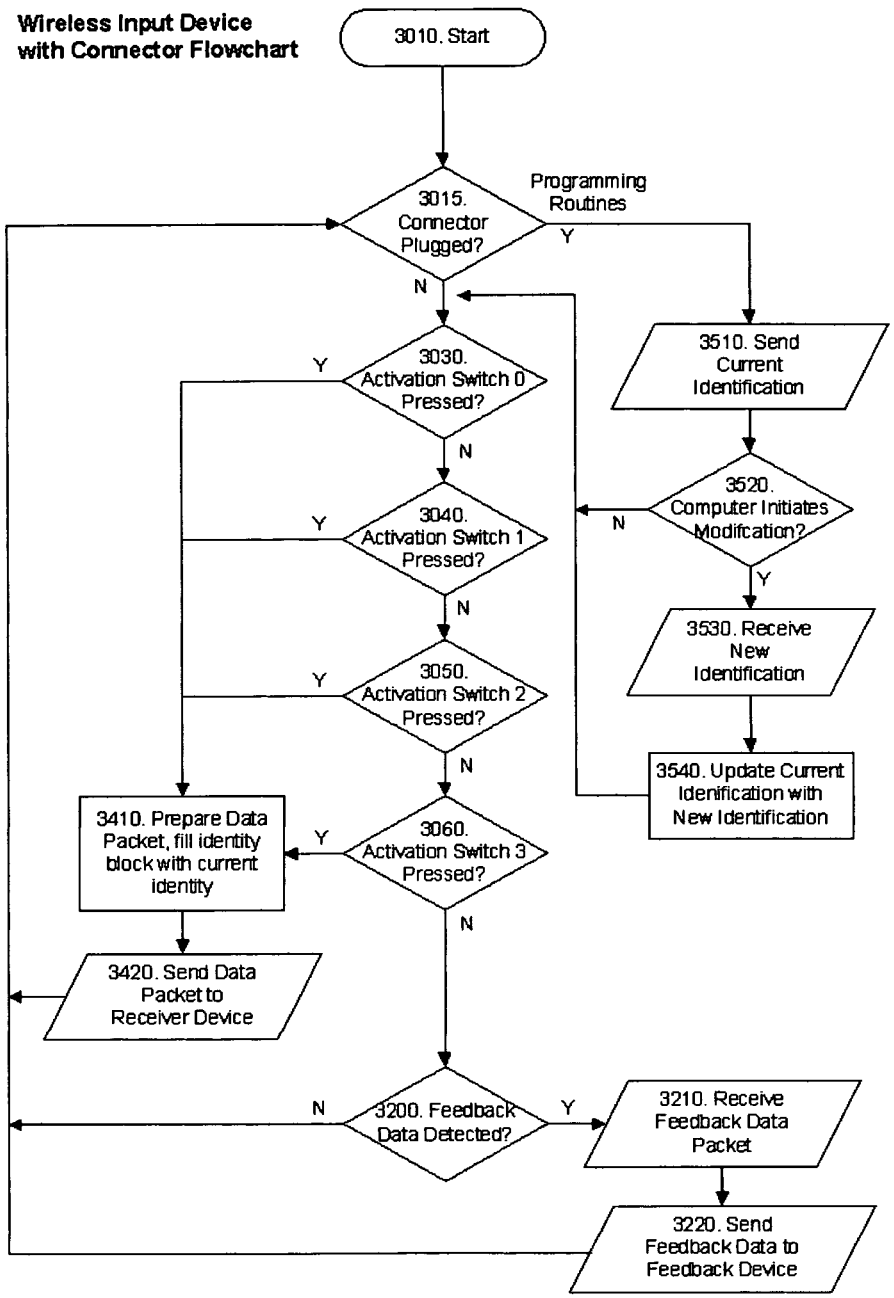
FIG. 11 shows a flowchart of the software controlling the wireless input device with optional physical contact to the computer system.

FIG. 11 shows the flowchart of the wireless input device of an additional embodiment whereby the wireless input device can be connected (3015) directly to a computer system through interface such as a computer port. When a wireless input device is connected to the computer system, the wireless input device can be programmed through the interface. The wireless input device sends (3510) the current identification to the computer system and checks (3520) if the computer system initiates an identification modification sequence. If the wireless input device receives request from the computer system for identification modification, the wireless input device waits (3530) for a new identification from the computer system. If the new identification is received, the wireless input device updates (3540) the value of the current identification with the value of the new identification. With some minor modifications, it is also possible to make the wireless input device communicate with the computer system through the connector during use or operation, without the receiver device.

Figure 12:
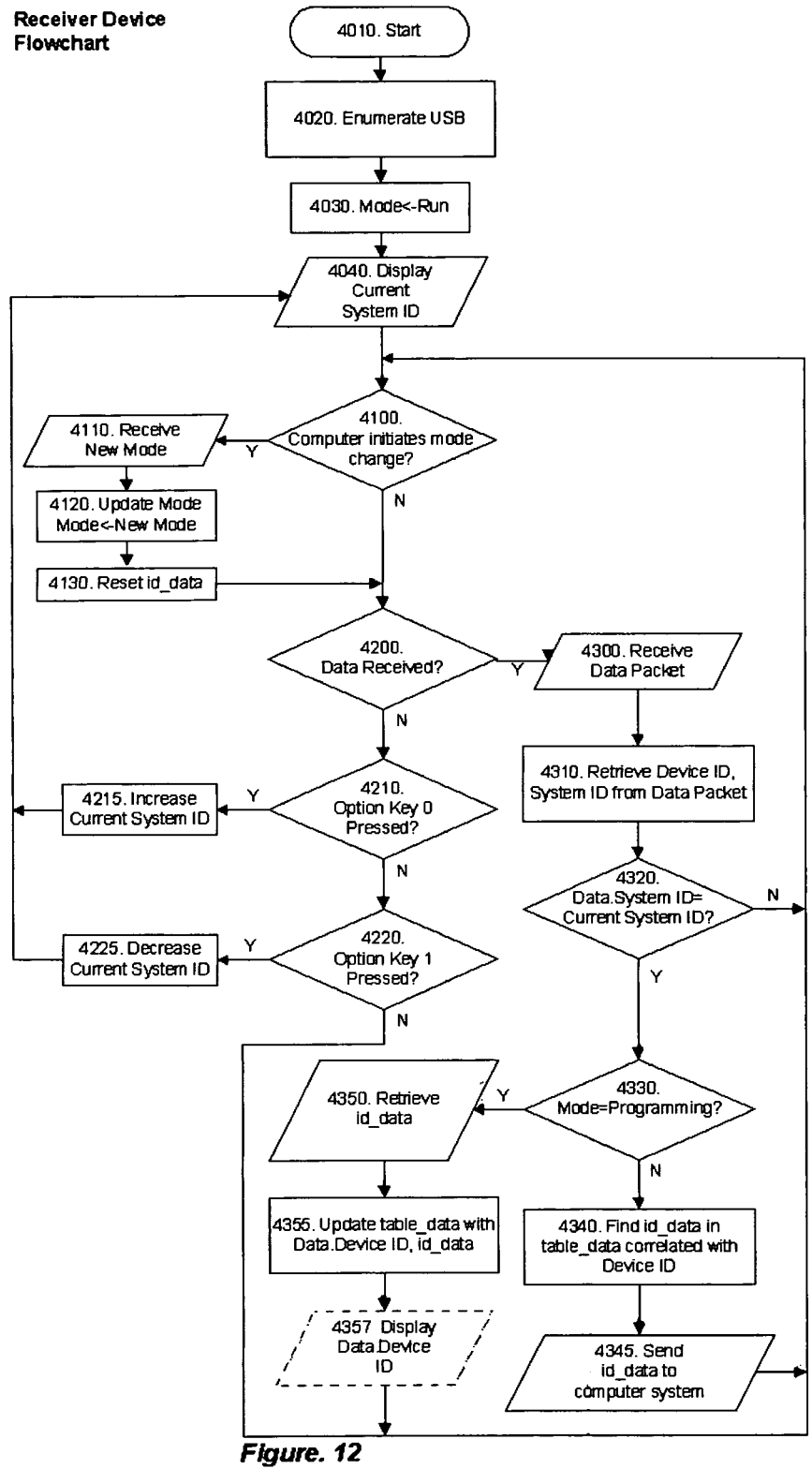
FIG. 12 shows a flowchart of the software controlling the receiver device.

FIG. 12 shows the flowchart of the software that controls the receiver device of the preferred embodiment. When the receiver device starts (4010), the software starts the USB enumeration process (4020). It is preferred that the receiver device registers itself as an HID device to avoid the necessity of custom device driver. After the enumeration sequence is finished, the software initializes the current mode to running mode (4030) then displays the current system identification code (4040). The software then checks if the computer it is attaches requests a mode change (4100). If the computer requests a mode change, the software retrieves the new mode (4110), updates the current mode, then resets the id_data variable and executes the next step (4200). If the computer does not request a mode change, skips the above steps and proceeds to the next step, which is checking (4200) if a wireless input device is sending a data packet. If a data packet is detected, it is received (4300) and processed to extract (4310) information about the wireless input device that sent the data packet, comprising the device identification and the system identification. After the system identification code of the wireless input device is retrieved, the software checks (4320) if that system identification code matches the system identification code of the receiver device. If it does not match, the data packet is ignored and the entire loop (4100) is executed again. The next step depends on the current mode of the receiver device (4330). If it is not in programming mode, the software searches for the data correlated with the device identification of the wireless input device, copies it to id_data variable, send the value of its value to the computer system, and repeats the entire loop (4100). If the receiver device is in programming mode, it retrieves (4350) the value of id_data from the computer, and selectively updates (4355) the correlation table between device identification code and id_data with the current id_data and device identification code. If the wireless input device does not have an embedded display, the receiver device preferably displays (4157) the device identification code retrieved from the data packet. The entire loop (4100) is executed again as soon as the last process is finished. If no data packet is received, the software checks if an option key if pressed (4210; 4220). If one of the option keys is pressed, the software increases (4215) or decreases (4225) the current system identification code, depending on the option key pressed, displays (4040) the current system identification code, and executes the entire loop all over again (4100).

The flowchart shown in FIG. 12 also shows that the system can be used in any computer with USB connector, since the receiver device comprises a table to correlate the device identification of the wireless input device with data that can be understood by a computer system without a keymapper program.

Furthermore, since the flowchart shows that the identifications are stored in memory instead of mechanically coded in a selector or rotary switch, the number of possible system identification of the receiver device is limited only by the capability of the microcontroller being used.

Figure 13:
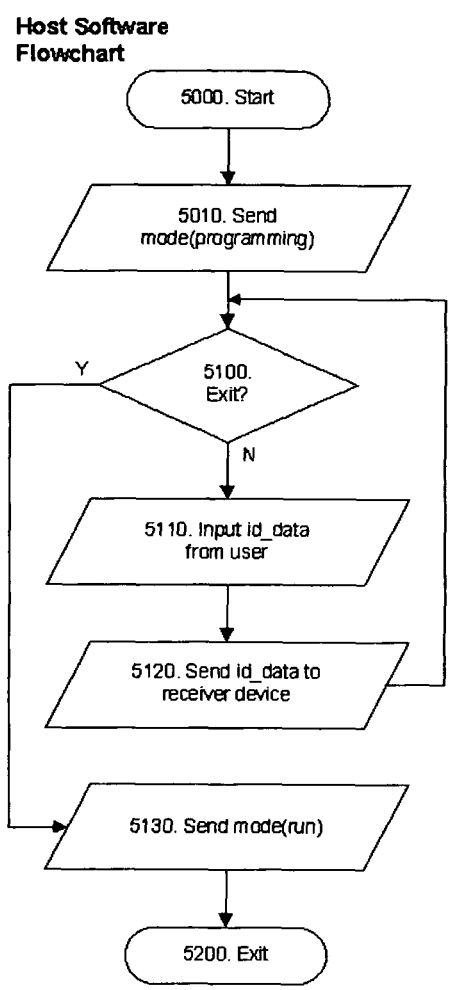
FIG. 13 shows a flowchart of the software controlling the host software.

FIG. 13 shows the flowchart of the software that controls the computer system the receiver device attached to. When a user runs (5000) the software and initiates programming mode, the software sends (5010) request to the receiver device to change its mode to programming mode. Until the user ends (5100) the programming mode, the software requests (5110) id_data data from the user and sends (5120) it to receiver device. When an exit command is initiated (5100), the software sends (5130) request to the receiver device to change its mode to running mode then quits (5200).

What is claimed is:

1. A computer-aided occupational therapy and education tool comprising a customizable wireless input device and a separate receiver device remote in its entirety from the wireless input device during operation and configured to receive data from said wireless input device, wherein:
 (a) the wireless input device comprises:
  a casing
  means for altering the appearance of the casing
  operated means disposed on the surface of said casing
  a transmitter unit attached to the casing for communicating with the receiver device
  means for assigning identification to the wireless input device
  means on the casing for displaying the identification of the wireless input device
 (b) the receiver device comprises
  a receiver unit for communicating with the wireless input device
  a processor electrically connected to the receiver unit
  means for connecting said receiver device to a computer
  whereby said computer-aided occupational therapy and education tool can be safely used to rehabilitate and/or teach young children or children with developmental delays comprising autism spectrum disorders and/or mental retardation.

2. The tool of claim 1 wherein said operated means is configured to be operated by applying pressure on the casing or directly on the operated means.

3. The tool of claim 1 wherein said means for altering the appearance of the casing is a mechanism for removably attaching one or more sheets, whereby one of the sheets has indicia on it.

4. The tool of claim 1 wherein the receiver device further comprises means for assigning identification to the receiver device and means for displaying the identification.

5. The tool of claim 1 wherein the wireless input device further comprises a processor.

6. The tool of claim 1, wherein the wireless input device further comprises a receiver unit and the receiver device further comprises a transmitter unit.

7. The tool of claim 6 wherein said means for altering the appearance of the casing is a graphic display.

8. The tool of claim 1 wherein said operated means is a touch sensor disposed on the upper surface of the casing.

9. The tool of claim 1 wherein said operated means is one or more switches disposed on the lower surface of the casing.

10. The tool of claim 1 wherein the wireless input device further comprises urging means to urge the casing of the wireless input device upward.

11. The tool of claim 1, wherein the wireless input device further comprises means for communicating with a computer system through direct connection or wire whereby the main use of the direct connection is for programming or altering the identification of the wireless input device.

12. The tool of claim 1, wherein the means for assigning identification comprises one or more switches.

13. A computer-aided occupational therapy and education tool comprising a wireless input device, a covering, and a receiver device separate and remote in its entirety from the wireless input device during operation and configured to receive data from said input device, wherein:

(a) the wireless input device comprises:
   a casing adapted to be removably attached to the lower surface of the covering
   operated means disposed on the surface of said casing wherein the operated means is adapted to be operable by applying pressure on the casing or directly on the operated means
   a transmitter unit attached to the casing
   means for assigning identification to the wireless input device
   means on the casing for displaying the identification of the wireless input device
   whereby:
     said wireless input device can be customized by attaching it to a different covering that can be used in a manual therapy session
(b) the covering comprises:
   a surface adapted to be removably attached to the wireless input device
   means for relaying, to the wireless input device, pressure applied to the covering, wherein said covering is adapted to cover at least the upper surface of the wireless input device,
(c) the receiver device comprises
   a receiver unit for communicating with the wireless input device
   a processor electrically connected to the receiver unit
   means for connecting said receiver device to a computer
   whereby said computer-aided occupational therapy and education tool can be safely used to rehabilitate and/or teach young children and/or children with developmental delays comprising autism spectrum disorders and/or mental retardation.

14. The tool of claim 13 wherein the means for assigning identification is an identification code stored in a memory.

15. The tool of claim 13 wherein said means for displaying the identification of the wireless input device is a display embedded on the wireless input device, the receiver device, the covering, or a computer system.

16. The tool of claim 13 wherein said wireless input device further comprises a processor whereby:
(a) the processor controls the data transmitted by said wireless input device
(b) the processor checks, by pooling method or interrupt), responses to the pressure applied directly or indirectly to the operated means
(c) the processor controls modification of said identification code.

17. The tool of claim 13 wherein the identification of said wireless input device is a composite identification comprising a device-identification and a system-identification.

18. The tool of claim 17 further comprising means for assigning and displaying a system identification code to the receiver device.

19. The tool of claim 13 wherein said means for assigning identification is one or more switches.

20. The tool of claim 13 wherein said wireless input device further comprising a receiver unit and said receiver device further comprising a transmitter unit.

21. The tool of claim 20 wherein said wireless input device further comprising means to selectively pass on data or control commands received from a computer to the covering.

22. The tool of claim 20 wherein said tool comprising means to alter the identification code of said wireless input device from an external device comprising a computer system.

23. The tool of claim 20 wherein the wireless input device and the covering further comprise an output device configured to provide output to a user whereby said output comprises light, sound, visual data, or movements.

24. The tool of claim 23 further comprising an attaching mechanism configured to removably secure said output device.

25. The covering of claim 13 wherein said covering is adapted to be removably attachable to another covering.

26. The tool of claim 13 wherein said covering is made from a resilient material.

27. The tool of claim 13 wherein the surface of said covering is textured whereby said textured surface provides tactile input to a user.

28. The tool of claim 13 wherein said wireless input device and said covering don't present a choking hazard.

29. The tool of claim 13 wherein said operated means is a touch-activated sensor.

30. The tool of claim 29 wherein said covering is conductive.

31. The tool of claim 13 wherein said operated means is a switch unit.

32. The tool of claim 31 wherein said switch unit is disposed on the bottom side of the casing of the wireless input device, facing downwardly.

33. The tool of claim 31 wherein said switch unit is a plurality of switches.

34. The tool of claim 33 wherein said plurality of switches are normally close switches connected in parallel manner or normally open switches connected in serial manner.

35. The tool of claim 31 further comprising an urging means to urge the wireless input device and the covering upward or said covering in a direction leaving the casing of said wireless input device.

36. The tool of claim 35 further comprising means for removably attaching said urging means to said tool.

37. The tool of claim 35 further comprising means for adjusting the urge of said urging means.

38. The tool of claim 35 wherein said urging means is a plurality of coil springs.

39. The tool of claim 35 wherein said urging means is a plurality of cups made from a resilient material.

40. The tool of claim 13 further comprising means for securing said tool to a surface whereby said surface is adequately even.

41. The tool of claim 40 wherein means for securing is one or more suction cups disposed on the bottom side of the tool.

42. The tool of claim 40 wherein means for securing is one or more magnets disposed on the bottom side of the tool.

43. The tool of claim 13, wherein the wireless input device further comprises means for altering the appearance of said casing.

44. The tool of claim 13 wherein the covering further comprises means for altering the appearance of said covering.

45. The tool of claim 44 wherein said means for altering the appearance is one or more stickers disposed on the surface of said covering.

46. The tool of claim 44 wherein said means for altering the appearance is a graphic display.

47. The tool of claim 44 wherein said means for altering the appearance is a means for removably attaching one or more sheets on the surface of said covering whereby there is one laminated sheet with indicia or two sheets, one with indicia and one made from a transparent or semi-transparent material for protecting the first sheet.

48. The tool of claim 13 wherein the receiver unit of said receiver device is a radio frequency receiver and the transmitter unit of said wireless input device is a radio frequency transmitter.

49. The tool of claim 13 wherein the receiver unit of said receiver device is an infrared receiver and the transmitter unit of said wireless input device is an infrared transmitter.

50. The tool of claim 13 wherein the receiver unit and the transmitter unit of said receiver device, and the transmitter unit and the receiver unit of said wireless input device conform to a widely accepted wireless communication standard comprising radio frequency transmission.

51. The tool of claim 13 wherein said means for connecting said receiver device to a computer is a standard device interface whereby the device interface comprises a USB, serial, or Parallel interface.

52. The tool of claim 13 wherein said casing can be attached with more than one wireless input devices.

53. The tool of claim 13, wherein the wireless input device further comprises means for communicating with a computer system through direct connection or wire whereby the main use of the direct connection is for programming or altering the identification of the wireless input device.

* * * * *